Feb. 16, 1943.   W. S. MASON   2,311,559
PISTON RING
Filed July 24, 1942

INVENTOR,
William S. Mason

Patented Feb. 16, 1943

2,311,559

UNITED STATES PATENT OFFICE 2,311,559

PISTON RING

William S. Mason, Norfolk, Va.

Application July 24, 1942, Serial No. 452,123

9 Claims. (Cl. 309—45)

This invention relates to piston rings and more particularly to packing rings applicable for use in the cylinders of internal combustion engines.

One object of my invention is to provide a packing ring which will permit free oil drainage between the wall of the cylinder and the drain ducts in the bottom of the groove in the piston.

Another object is to provide a packing in which the spacer ring provides free oil drainage, and at the same time prevents the sides of the piston ring from being whipped away from the side walls of the groove of the piston at high engine speeds, permitting excessive oil leakage between the piston ring and the side walls of the groove.

Another object is to provide an improved spacer ring for piston rings.

Another object is to provide a ring having integral means for increasing its inherent radial expansibility so that it will tend to follow a tapered cylinder as well as a circular one when used in a modern high speed internal combustion engine.

Figure 1:
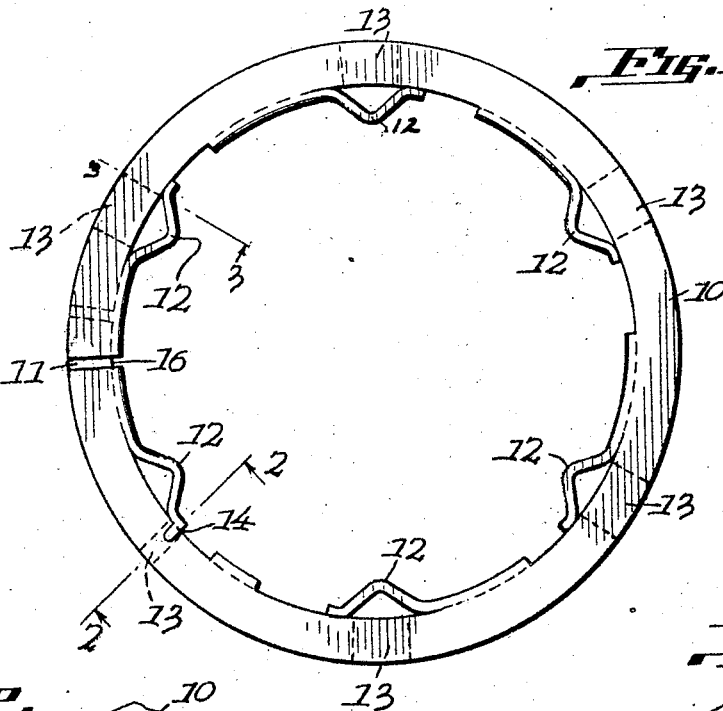
Figure 2:
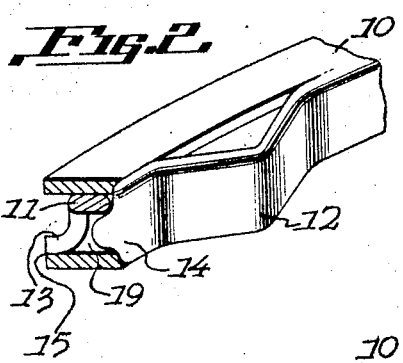
Figure 3:
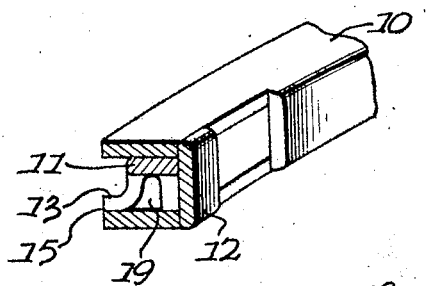
Figure 4:
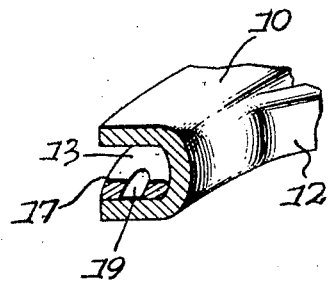
Figure 5:
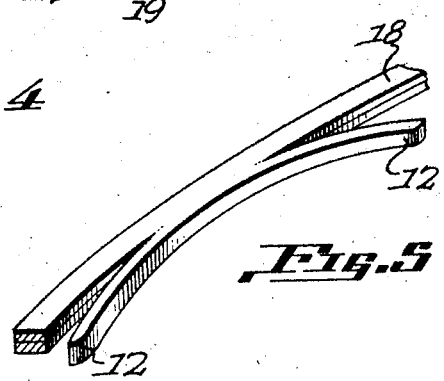

Other objects and advantages will be brought out in the following description and claims wherein they will be more readily apparent when read in conjunction with the accompanying drawing, in which:

Figure 1 is a top view of a packing ring constructed according to the present invention;

Figures 2 and 3 are fragmentary perspective views of the ring shown in Figure 1, on the lines 2—2, and 3—3 looking in the direction of the arrows; and Figures 4 and 5 are fragmentary perspective views of modifications.

Figure 6:
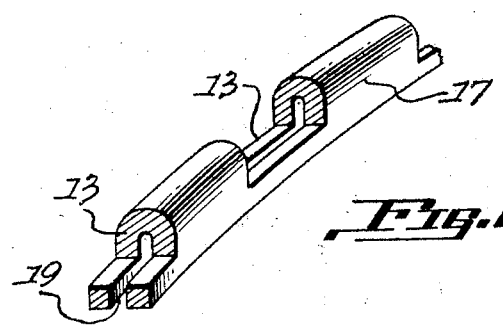

Figure 6 is a perspective view of a spacer element.

The packing shown in Figure 1, consists of piston ring 10, which comprises an elongated band of resilient metal doubled upon itself longitudinally forming the upper and lower sides of the ring and its edges forming the outer periphery and its medial portion forming the inner periphery and spacing said sides apart axially, and a U shaped spacer ring 11, interposed between the upper and lower sides of the piston ring so as to maintain the axially spaced arrangement of the sides outwardly of the inner periphery and provide additional bearing surface for spring fingers 12, formed in the inner periphery of the piston ring and utilized to supplement its radial expansibility. The spacer ring is provided with slots 13, arranged to provide free oil drainage to the drain ducts in the bottom of the groove in the bottom of the piston. The slots extend radially from the outer to the inner periphery of the ring and greatly increase its radial flexibility so that less radial pressure is required to urge its periphery against the wall of the cylinder, also the slots are arranged to divide the outwardly extending flange or lip 15 into a series of flanges so it will more readily conform to the shape of a worn cylinder wall making the ring especially useful as a replacement ring. The arrangement of the slots and the shape of the ring is more clearly shown in Figures 2 and 3. Figure 2 also shows means for maintaining the annularly spaced arrangement of the spacer relative to the piston ring. One spring finger has an end 14, extending outwardly and disposed in a slot of the piston ring. One advantage being the joint 16, of the piston ring is overlapped axially by one flange of the spacer substantially reducing leakage at the joints of both rings, also the rings can be arranged so as to have more uniform radial expansibility.

In ring 17, shown in Figure 4, the slots 18, are disposed inwardly of its periphery so the outermost side of the expander presents an unbroken sealing and scraping surface to the wall of the cylinder. In addition to providing free oil drainage to the bottom of the groove in the piston the slots extend to channel 19, permitting oil to lubricate the free edges of the spacer ring. This reduces wear and increases the useful life of the ring and improves its sealing action.

The ring 18, shown in Figure 5, is particularly useful under conditions where extremely high temperatures prevail and where ordinary expander rings and springs tend to overheat and lose their expansiveness, such as the top grooves in a piston of a high compression internal combustion engine. The springs are made extremely long to increase their radial flexibility and are made relatively thick so they will not overheat, also they are constructed to have a large amount of surface in contact with the inner periphery of the upper and lower sides of the ring this also tends to prevent them from overheating.

Some further advantages of the spacer rings disclosed herein, are: 1. One side of the spacer provides a good bearing surface for the expander springs. 2. The slots are arranged to increase the radial flexibility of the ring so less radial pressure is required to seat its periphery and it more readily conforms to the shape of the cylinder wall. 3. The slots increase the radial flexibility of the ring without increasing its axial flexibility, whereby it prevents the sides of the piston ring from being thrown away from the side walls of the groove at high engine speeds permitting excessive oil leakage therebetween.

4. The spacer consisting of an elongated band of metal doubled upon itself with its medial portion forming one axial face and its edges forming the other, is relatively light in weight, simple and cheap to manufacture, and can be made of any kind of ductile metal that would best suit the particular conditions under which the ring was to be used. For example when used in a modern high speed high compression engine, it could be made of aluminum, which is relatively light in weight, has good heat conductivity and wearing surface.

In order to simplify the description and drawing only a few preferred embodiments of my invention have been illustrated, however it will be readily apparent that either the piston ring or the spacer ring can be utilized in combination with other types of rings to form a packing. Therefore I wish to be limited only the scope of the following claims.

I claim:

1. For use in a cylinder in combination with a reciprocating piston provided with a piston ring groove of given radial depth, a piston ring comprising an elongated band of resilient metal doubled upon itself longitudinally forming the upper and lower sides of the ring and its edges forming the outer periphery and its medial portion forming the inner periphery, said outer periphery being formed and arranged to seal the wall of said cylinder and said inner periphery being provided with radially expansible spring fingers, said spring fingers being integrally connected to said upper and lower sides and seated on their inner periphery and adapted to urge the outer periphery of the ring against the wall of said cylinder when the piston is disposed therein.

2. For use in a cylinder in combination with a reciprocating piston provided with a piston ring groove of given radial depth, a piston ring comprising an elongated band of resilient metal doubled upon itself longitudinally forming the upper and lower sides of the ring and its edges forming the outer periphery and its medial portion forming the inner periphery and spacing said sides apart axially, said outer periphery being formed and arranged to seal the wall of said cylinder and said inner periphery being provided with radially expansible spring fingers, said spring fingers being integrally connected to said upper and lower sides and seated on their inner periphery and adapted to urge the outer periphery of the ring against the wall of said cylinder when said piston is disposed therein.

3. The structure of claim 2, in which additional means is interposed between said upper and lower sides of the ring to maintain their axially spaced arrangement outwardly of said inner periphery.

4. The structure of claim 2, in which an additional ring is interposed between said upper and lower sides to maintain their axially spaced arrangement outwardly of their inner periphery and provide additional bearing surface for said spring fingers.

5. For use in a cylinder in combination with a reciprocating piston provided with a piston ring groove of given radial depth and having upper and lower side walls, a resilient metal split piston ring comprising an annular band provided with radially expansible spring fingers and having upper and lower sides formed and arranged to seal the side walls of said groove and the wall of said cylinder and spaced apart axially outwardly of their inner periphery by an interposed spacer ring, said spring fingers being integrally connected to said upper and lower sides of the ring and seated on their inner periphery and the inner periphery of said spacer ring and adapted to urge the outer periphery of the spacer ring and the upper and lower sides of said piston ring against the wall of the cylinder when the piston is disposed therein.

6. For use in a cylinder in combination with a reciprocating piston provided with a packing ring groove of given radial depth, a packing comprising a piston ring and a spacer ring, said piston ring comprising an elongated band of resilient metal doubled upon itself longitudinally forming the upper and lower sides of the ring and its edges forming the outer periphery and its medial portion forming the inner periphery and spacing said sides apart axially and being provided with spring fingers, said spacer ring being interposed between said upper and lower sides and formed and arranged to maintain their axially spaced arrangement outwardly of their inner periphery and said spring fingers being connected to said upper and lower sides and seated on their inner periphery and the inner periphery of said spacer ring and adapted to urge the outer periphery of the spacer ring and the upper and lower sides of the piston ring outwardly against the wall of the cylinder when said piston is disposed therein.

7. The structure of claim 6, in which said spacer ring is substantially U shaped in cross section and is interposed between said upper and lower sides with its bottom and free edges seated respectively on the inner axial faces of the upper and lower sides of said piston ring.

8. The structure of claim 6, in which said spacer ring is substantially U shaped in cross section and its outermost side is slightly inclined to the axis of the ring and arranged to seat on the wall of said cylinder.

9. The structure of claim 6, in which said spacer ring is substantially U shaped in cross section and has one of its free edges provided with a radially extending flange and is arranged with said flange seated on the wall of said cylinder.

WILLIAM S. MASON.